United States Patent [19]

Upchurch et al.

[11] Patent Number: 4,829,035

[45] Date of Patent: May 9, 1989

[54] REACTIVATION OF A TIN OXIDE-CONTAINING CATALYST

[75] Inventors: Billy T. Upchurch, Virginia Beach; Irvin M. Miller, Newport News; Kenneth G. Brown, Virginia Beach; Robert V. Hess, Newport News; David R. Schryer, Hampton; Barry D. Sidney, Gloucester; George M. Wood, Newport News; Patricia A. Paulin, Hampton, all of Va.

[73] Assignee: The United States of America as represented by Administrator of the National Aeronautics and Space Adminstration, Washington, D.C.

[21] Appl. No.: 116,822

[22] Filed: Nov. 5, 1987

Related U.S. Application Data

[63] Continuation-in-part of Ser. No. 874,320, Jun. 12, 1986, abandoned.

[51] Int. Cl.$^4$ ............................................. B01J 38/02
[52] U.S. Cl. ........................................ 502/34; 502/56; 502/339; 502/352; 372/59; 204/157.51
[58] Field of Search ..................... 502/34, 42, 50, 53, 502/56, 339, 352; 204/157.51; 372/59

[56] References Cited

U.S. PATENT DOCUMENTS

| 2,183,301 | 12/1939 | Bossner et al. | 502/56 |
| 2,575,258 | 11/1951 | Corneil et al. | 502/50 |
| 2,816,857 | 12/1957 | Hemminger | 502/53 |
| 3,230,179 | 1/1966 | Schwarzenbek | 502/53 |
| 4,077,913 | 3/1978 | Acres et al. | 502/339 |
| 4,379,756 | 4/1983 | Weitz et al. | 502/34 |
| 4,490,482 | 12/1984 | Mathieu | 502/339 |
| 4,524,051 | 6/1985 | Wright et al. | 502/353 |
| 4,547,886 | 10/1985 | Kaminski et al. | 372/59 |
| 4,651,324 | 3/1987 | Prein | 372/59 |
| 4,757,512 | 7/1988 | Macken | 372/59 |

FOREIGN PATENT DOCUMENTS 2083687  3/1982  United Kingdom ............... 502/339

*Primary Examiner*—Anthony McFarlane
*Attorney, Agent, or Firm*—George F. Helfrich; John R. Manning; Charles E. B. Glenn

[57] ABSTRACT

A method for the reactivation of a tin oxide-containing catalyst of a $CO_2$ laser is provided. First, the catalyst is pretreated by a standard procedure. When the catalyst experiences diminished activity during usage, the heated zone surrounding the catalyst is raised to a temperature which is the operating temperature of the laser and 400° C. for approximately one hour. The catalyst is exposed to the same laser gas mixture during this period. The temperature of the heated zone is then lowered to the operating temperature of the $CO_2$ laser.

5 Claims, No Drawings

REACTIVATION OF A TIN OXIDE-CONTAINING CATALYST

ORIGIN OF THE INVENTION

The invention described herein was made jointly in the performance of work under NASA Contract Nos. L-79510B and L-83135B with Chemicon and NASA Contract NAS1-17099 with Old Dominion Research Foundation and employees of the United States Government. In accordance with 35 USC 202, the contractors have elected not to retain title.

This application is a continuation-in-part of co-pending application, Ser. No. 874,320, filed June 12, 1986, abandoned.

BACKGROUND OF THE INVENTION

This invention relates generally to the reactivation of a catalyst and in particular to the reactivation of a tin oxide-containing catalyst.

New approaches for extending the life of lasers used in a wide variety of applications are under investigation. One aspect of the rapid progress in this area is that new techniques for long lifetime space applications of high pulse energy, common and rare isotope, closed-cycle $CO_2$ lasers are being studied. The high-energy, pulsed $CO_2$ lasers must be operated closed-cycle to conserve gas, especially if rare-isotope gases are used. Rare-isotope gases, such as $C^{18}O_2$ are used for improved transmission of the laser beam in the atmosphere.

The electrons in electric-discharge $CO_2$ lasers cause dissociation of some $CO_2$ into $O_2$ and CO and attach themselves to electronegative molecules such as $O_2$, forming negative $O_2^-$ ions, as well as larger negative ion clusters by collisions with CO or other molecules. For closed-cycle, sealed $CO_2$ laser operation, the concentration of negative ions/clusters may become sufficiently high to form discharge instabilities which may ultimately disrupt the $CO_2$ laser operation. The decrease in $CO_2$ concentration due to dissociation into CO and $O_2$ will reduce the average repetitively pulsed or continuous wave laser power, even if no disruptive negative ion instabilities occur.

Accordingly, it is the primary object of this invention to extend the lifetime of a catalyst used to combine the CO and $O_2$ products formed in a laser discharge.

It is a further object of this invention to accomplish the primary object simply and inexpensively.

Other objects and advantages will be apparent in the specification which follows.

SUMMARY OF THE INVENTION

According to the present invention, the foregoing and additional objects are obtained by a reactivation of the tin oxide-containing catalyst of a $CO_2$ laser. First, the catalyst is pretreated by a standard procedure. When the catalyst experiences diminished activity during exposure to the circulating gas stream inside or external to the laser, the heated zone surrounding the catalyst is raised to a temperature between 100° C. and 400° C. for approximately one hour. During this period, the catalyst is still exposed to the circulating gas inside or external to the laser. The heated zone is then lowered to the nominal operating temperature of the catalyst. Accordingly, the activity of the catalyst for the $CO_2$ laser is reactivated.

DETAILED DESCRIPTION OF THE INVENTION

In a closed-cycle, high-energy pulsed $CO_2$ laser, $CO_2$ decomposition products, CO and $O_2$, that form in the laser discharge zone, must be recombined. A promising low temperature catalyst for combining CO and $O_2$ is platinum on tin oxide ($Pt/SnO_2$). Other comparable catalysts include tin oxide combined with one or more of the noble metals such as palladium.

First, the catalyst undergoes a standard pretreatment process. In a particular embodiment of the present invention, a 120 mg sample of $Pt/SnO_2$ is exposed to a flowing stream of reducing agent 1% CO in helium (He) for one hour while the sample is heated to a temperature of 225° C. The sample is then exposed to pure He flow for one hour at the same temperature, in order to prevent any CO from being trapped in the lattice structure of the sample while the sample is exposed to the higher temperature. Finally, the sample is cooled to 100° C. in a pure He flow for about one hour. The steady-state activity of the catalyst after this pretreatment was double the activity of the catalyst without any pretreatment or with a pretreatment for the same length of time in pure He as opposed to 1% CO in He. Thus, pretreatment with the reducing agent CO significantly increased the activity of the $Pt/SnO_2$ catalyst. Note that the size of the sample is arbitrary. The process will work effectively on a tin oxide-containing catalyst of any size provided that an adequate volume of CO is used.

CO is used because of its ability to be chemisorbed by the surface of the $Pt/SnO_2$ catalyst. The percentage of CO in He is arbitrary. One percent was chosen for safety reasons. In addition, the He serves as an inert carrier for the CO and therefore could be suitably replaced by any other of the Group VIII gases. Note that the carrier must be inert with respect to the reducing agent and the catalyst.

The 1 hour pretreatment time described above is arbitrary. A similar enhancement in activity could occur after a shorter or longer pretreatment time depending on the percentage of the CO reducing agent in the carrier gas, the gas flow rate, the heating temperature of the catalyst and the size of the catalyst sample. The pretreatment is considered complete when no measurable quantity of $CO_2$ is given off by the catalyst.

The pretreatment temperature of the catalyst will be effective in the range of 100°–400° C. However, 225° C. was chosen as an optimum for achieving a pretreatment time of about one hour while maintaining the integrity of the surface area of the catalyst, since higher temperatures may damage the integrity of the surface.

After this standard pretreatment, the catalyst is ready for its low temperature use in the sealed, high-energy, pulsed $CO_2$ laser. However, after about 3000 minutes of operation, the activity of the catalyst begins to slowly diminish. Thus, a method is required to reactivate the catalyst The present invention provides such a method. First, the heated zone surrounding the catalyst is heated between 100° C. and 400° C. by an external heating source. A lower limit of 100° C. was chosen because this temperature is usually the maximum operating temperature of a $CO_2$ laser and the heated zone must be raised above this temperature. An upper limit of 400° C. was chosen because temperature in excess of this limit may result in damage to the surface integrity of the catalyst.

A temperature of 225° C. was experimentally found to provide an adequate temperature for reactivation.

The catalyst is exposed to the same circulating stream of gas that was continually drawn from and returned to the laser envelope. This laser gas mixture may contain a rare oxygen isotope in the $CO_2$ molecule. The oxide containing catalyst may contain the same rare oxygen isotope so that contained in the $CO_2$ molecule.

This constant heating and exposing the catalyst to the laser gas mixture is maintained for an hour. However, neither the time of heating and exposing nor the amount of heating is specific. Rather, they are functions of the integrity of the surface of the catalyst and the desired reactivation time, respectively. Note, however, that while the reactivation time may be decreased by increasing the temperature, this also increases the risk of damaging the integrity of the surface of the catalyst. Thus, the temperature and heating time will vary with the catalyst material.

After heating and exposing for an appropriate amount of time, the heated zone around the catalyst is allowed to return to the nominal operating temperature of the $CO_2$ laser. This temperature normally resides in the range of 23° C. to 100° C. .

Catalyst activity can be measured as the percentage conversion of CO to $CO_2$. In the specific embodiment described above, the initial steady state conversion percentage was 70%. After four days this conversion percentage decreased to 67%. No decrease in activity is acceptable because the catalyst must maintain its activity for long periods of time. However, after being subjected to the reactivation process of the present invention, the conversion percentage rose to 77%. Such a reactivation not only returned the catalyst to its initial steady state, but resulted in a 10% improvement over the initial steady state value.

Accordingly, the present invention allows for a restoration to the initial steady state activity of the catalyst of a $CO_2$ laser. In addition, the present invention exceeds this steady state value, thus resulting in improved combination activity. The present invention accomplishes these desirable results simply and inexpensively.

We claim:

1. A method for reactivating a catalyst comprised of tin oxide and a noble metal, wherein said catalyst is used to combine a laser gas mixture of CO and $O_2$ to form $CO_2$ for use in a $CO_2$ laser having an operating temperature between about 23° C. and 110° C., said method comprising:

exposing the catalyst to a stream of the laser gas mixture which is drawn from and returned to the laser;

increasing the ambient temperature surrounding the catalyst between a temperature above the operating temperature of the laser and 400° C. for a time sufficient to reactivate the catalyst;

reducing said ambient temperature to the operating temperature of the laser;

whereby the combination activity of the catalyst is improved.

2. The method of claim 1 wherein the ambient temperature surrounding the catalyst is increased to 225° C.

3. The method of claim 2 wherein said temperature of 225° C. is maintained for one hour prior to reduction to the operating temperature of the laser.

4. The method of claim 1 wherein the laser gas mixture contains a rare oxygen isotope in the $CO_2$ molecule.

5. The method of claim 4 wherein the oxide of the catalyst contains the same rare oxygen isotope.

* * * * *